Aug. 16, 1955   W. J. LA BOSSIERE   2,715,294
DEVICE FOR ATTACHING A TRAP TO AN ANCHOR WIRE
Filed July 11, 1951
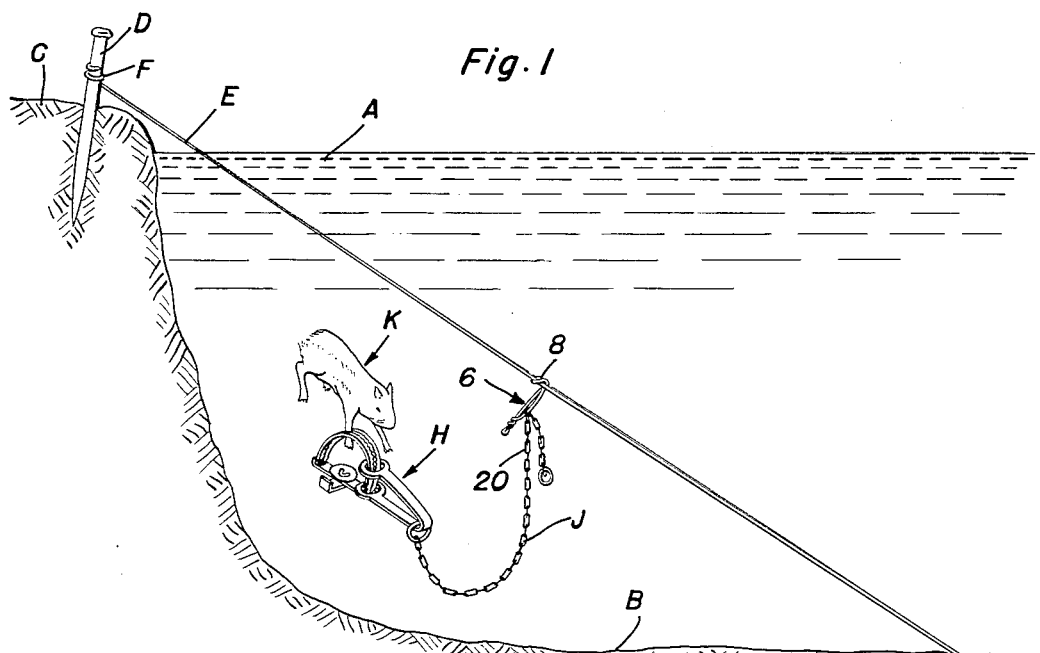
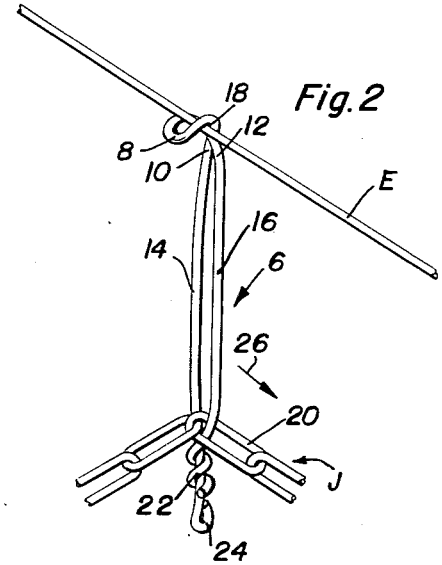
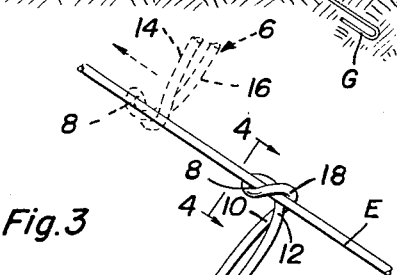
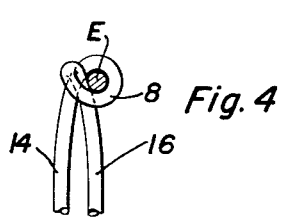
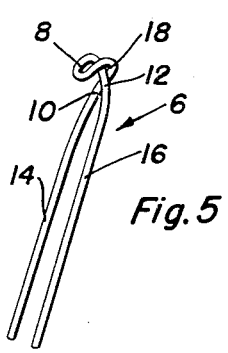
William J. LaBossiere
INVENTOR.
BY
Attorneys

United States Patent Office 2,715,294
Patented Aug. 16, 1955

2,715,294

DEVICE FOR ATTACHING A TRAP TO AN ANCHOR WIRE

William J. La Bossiere, Norway, Maine

Application July 11, 1951, Serial No. 236,225

2 Claims. (Cl. 43—96)

The present invention relates to certain new and useful improvements in devices, sometimes referred to generally as chain swivels, which are used for attaching the chain of an animal trap to a suitably staked anchoring wire, the type of a rod or wire which has one end fastened to a stake on a bank and the other end passing down through a body of water and anchored on the bottom thereof.

It is common trapping practice to slidably connect the chain of a beaver trap or equivalent trap, to an inclined chain anchoring wire which, as before stated, is used to prevent the trapped animal from dragging the trap too far afield from the place at which it was set by the trapper. The connection of the chain to the anchoring wire is made by way of various contrivances which have been referred to as drowning rings, one-way swivels, chain anchors and so on. The common purpose in all of these arrangements and adaptations is to permit the trapped animal to carry the trap and chain overboard in an effort to escape. The device which attaches the trap chain to the anchoring wire is allowed to slide along the wire in one direction permitting the trap to be hauled to the low point of anchorage of said wire. However, the device includes a friction grip preventing the same from being carried along the wire in a so-called retrograde direction.

The general object of the present invention is to functionally, structurally and otherwise improve upon prior art chain attaching swivels and the like and, in so doing, to provide a simple and practical construction in which manufacturers, users and others will find their essential requirements and needs fully met, contained and satisfactorily available.

More specifically, novelty is predicated upon a trap chain attaching device which is formed from a single length of suitable gauge substantially rigid wire, said device having spaced limbs at one end which may be joined with the links of the chain and attached thereto and being provided at the opposite end with structurally novel means for properly interconnecting the device with the stated anchoring wire.

A more specific object is to provide a simple length of wire which is bent upon itself to provide the stated limbs and which has its centrally bent portion fashioned into a friction gripping loop which may be called a friction-held cant-eye, the latter being at an acute angle to the axes of the limbs to attain the desired results.

Other objects and advantages will become more readily apparent from the following description and the accompanying sheet of illustrative drawings.

Figure 1 is a view which is primarily in perspective showing the animal trap, the staked chain anchoring wire and an improved device for attaching the free end of the chain to said wire.

Figure 2 is a fragmentary perspective view showing the attaching device with greater particularity and showing it in the angular position it takes when it is free to slide on said wire.

Figure 3 is a similar view wherein said device is in the position it assumes when it is frictionally "locked" and prevented from moving in a retrograde direction.

Figure 4 is a section taken on the vertical line 4—4 of Figure 3, looking in the direction of the arrows.

Figure 5 is a perspective view of the upper end of the attaching device per se.

Reference is made first to Figure 1 wherein a body of water is denoted at A, the bottom thereof at B and the shore or bank at C. There is a stake driven into the bank and the aforementioned anchoring wire, which usually inclines, is denoted by the letter E. This wire (sometimes a rod, chain or rope) is fastened at F to the stake. The opposite end G is appropriately embedded and anchored in the ground. The animal trap, which is conventional, is denoted by the numeral H and this is provided with the usual anchoring chain J, the animal being denoted at K. All of these are old parts and are shown in a well-known arrangement.

The improved chain sliding and attaching device is denoted by the numeral 6. This is preferably fashioned or formed from a length of suitably gauged wire. The wire is bent between its ends and upon itself to provide a bend or loop 8 and the adjacent portions of the wire are crossed as at 10 and 12 and the free end portions define what may be described as limbs 14 and 16. There is a crotch forming bend adjacent the crossed portions which bend is denoted at 18 and which serves to angle the loop to an approximate acute-angle position so that it functions as a friction holding cant-eye. It will be noticed that the opening in the stated cant-eye is of a minimum length and width greater than the cross-section of the anchoring wire, but is of a maximum width and length less than two or three times the diameter of said anchoring wire, whereby said cant-eye may swivel freely on said anchoring wire, may slide freely in one direction, but will be prevented from sliding relative to the wire in an opposite direction.

In practice the cant-eye is mounted on the wire E and the free ends of the limbs are passed through the desired link or links 20 of the chain. One end is twisted as at 22 around the other end to thus join the two ends together and the remaining limb 14 has a return bend 24 which constitutes an appropriate head and which avoids producing a point which would otherwise occur and perhaps tear the fur of the animal. When the eye and limbs assume the position shown in Figure 2 with said eye being approximately at right angles to the axis of the wire E, it is obvious that the device is free to slide from left to right or in the direction of the arrow 26. Thus, the chained trap may be slid freely down the inclined wire E toward the anchored end G. The device may also be twirled or swiveled around the wire using the wire as a center, said device then swinging through an orbital path, as presented in dotted lines.

When the eye is longitudinal with the wire a three-point binding or frictional contact is had and the movement of the device 6 in a direction from right to left is prevented. There are other devices in the prior art which operate on this same general principle but they are of different construction.

It is believed that by taking Figures 2, 3 and 5 together the reader will clearly understand the position in which the device slides freely, in the position in which it is "locked" against retrograde sliding.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention what is claimed as new is:

1. As a new article of manufacture, a device for attaching an animal trap chain to a staked anchoring wire comprising a length of wire having a bend between its ends, the respective portions of said wire adjacent to said bend being crossed and thus cooperating with said bend in defining a loop and provided with lateral bends extending alongside each other and providing a pair of limbs, a portion of said wire adjacent said crossed portions having a bend assisting in providing a junctural connection between said loop and limbs and serving to dispose said loop at an acute angle relative to the lengthwise axes of the limbs and thus providing a friction-held cant-eye, the opening in said eye being of a minimum length and width greater than the cross-section of said anchoring wire, whereby said cant-eye may swivel freely in one direction and is prevented from sliding relative to the wire in an opposite direction, the free end of one of said limbs having a return bend and the free end of the remaining limb having a twist therein and around the complemental limb and cooperating with said return bend in defining a tie for connecting said device to the trap chain.

2. As a new article of manufacture, a device for attaching an animal trap chain to a staked anchoring wire comprising a length of wire having a bend between its ends, the respective portions of said wire adjacent to said bend being crossed and thus cooperating with said bend in defining a loop and provided with lateral bends extending alongside each other and providing a pair of limbs, a portion of said wire adjacent said crossed portions having a bend assisting in providing a junctural connection between said loop and limbs and serving to dispose said loop at an acute angle relative to the lengthwise axes of the limbs and thus providing a friction-held cant-eye, the opening in said eye being of a minimum length and width greater than the cross-section of said anchoring wire, but of a maximum length and width less than two or three times the diameter of said anchoring wire, whereby said cant-eye may swivel freely on said anchoring wire, may slide freely in one direction and is prevented from sliding relative to the wire in an opposite direction.

References Cited in the file of this patent

UNITED STATES PATENTS

| Number | Name | Date |
|---|---|---|
| 370,860 | Dearing | Oct. 4, 1887 |
| 833,350 | Steele | Oct. 16, 1906 |
| 1,030,165 | Crites | June 18, 1912 |
| 1,073,226 | Freeman | Sept. 16, 1913 |
| 1,150,336 | Brooks | Aug. 17, 1915 |
| 2,275,737 | Dacey | Mar. 10, 1942 |

FOREIGN PATENTS

| Number | Country | Date |
|---|---|---|
| 156,968 | Germany | Dec. 9, 1904 |